March 12, 1940.　　　N. C. PRICE　　　2,193,142
GALLEY HEATING SYSTEM
Filed Dec. 1, 1937　　　3 Sheets-Sheet 1

Inventor
Nathan C. Price
By Charles L. Reynolds
Attorney

March 12, 1940. N. C. PRICE 2,193,142
GALLEY HEATING SYSTEM
Filed Dec. 1, 1937 3 Sheets-Sheet 2

Inventor
Nathan C. Price
By Charles L. Reynolds
Attorney

March 12, 1940. N. C. PRICE 2,193,142
GALLEY HEATING SYSTEM
Filed Dec. 1, 1937 3 Sheets-Sheet 3
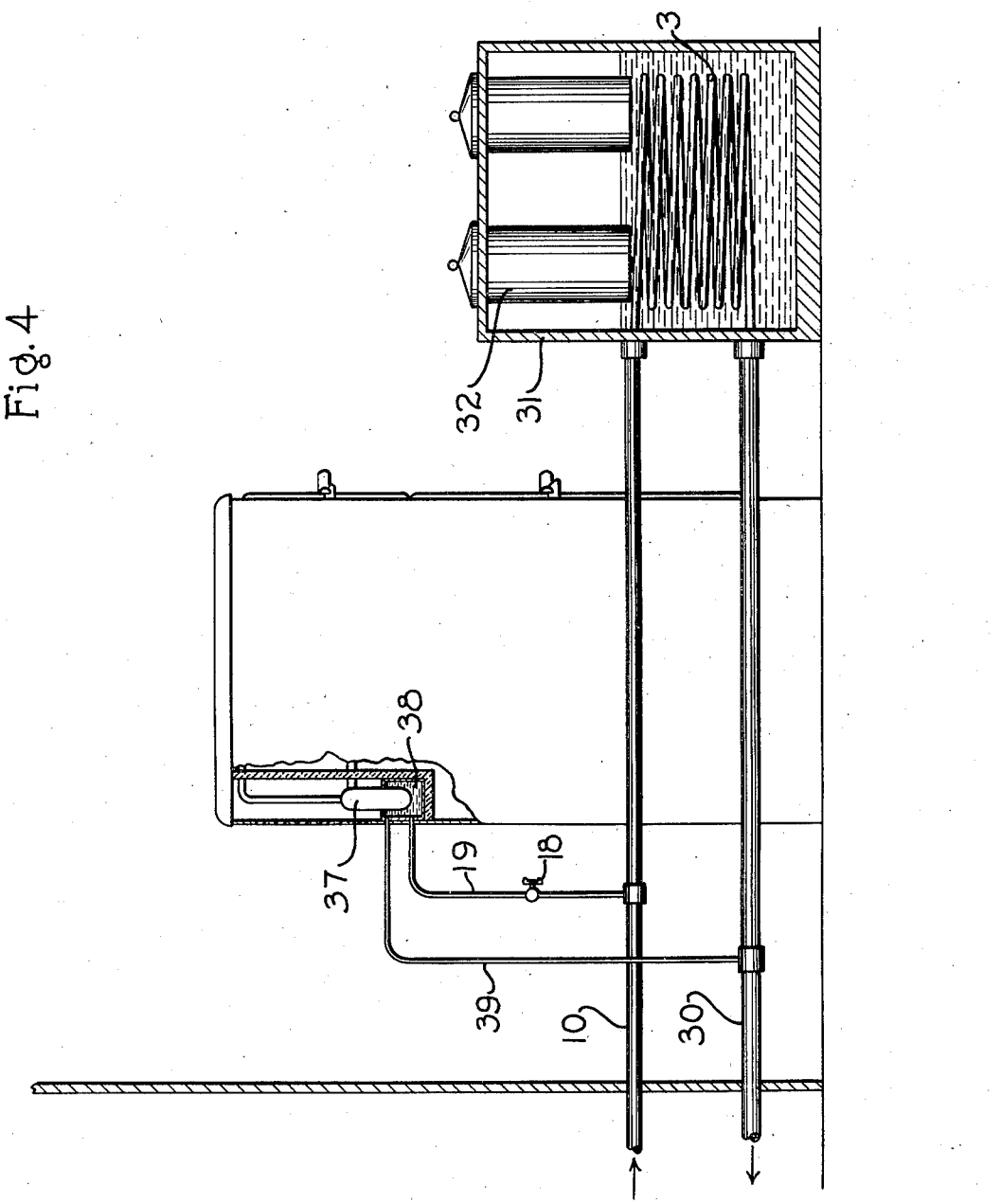
Inventor
Nathan C. Price
By Charles L. Reynolds
Attorney Patented Mar. 12, 1940

2,193,142

UNITED STATES PATENT OFFICE 2,193,142

GALLEY HEATING SYSTEM

Nathan C. Price, Seattle, Wash., assignor, by mesne assignments, to The Pacific National Bank of Seattle, Seattle, Wash., a national banking association Application December 1, 1937, Serial No. 177,526

17 Claims. (Cl. 237—8)

In aircraft traveling considerable distances without stops and carrying large numbers of passengers, it is essential that means be provided for cooking food. For reasons of safety, not to mention economy, it is extremely undesirable to employ an open flame, or even, were it practicable, hot electric reistance elements. The use of the latter, however, is impracticable inasmuch as it involves a considerable load upon a generator, or in the alternative, use of storage batteries which, with their appurtenances, would add considerably to the weight of the aircraft. The waste or dissipated heat from the engines, as typified by the hot exhaust gas, is a potential source of heat for cooking, but since the engines are normally located outboard on the wing, and the galley is located in the fuselage of the ship, distant from the engine nacelles, it is not practicable nor desirable to conduct such hot gases from the stack to the galley.

It is an object of the present invention, then, to provide means whereby adequate temperatures and an adequate supply of heat units can be provided in such a galley, preferably utilizing heat supplied by the hot exhaust gas, without, however, conducting such gas from the exhaust stack through the aircraft structure to the galley, and with minimum heat losses.

A convenient means of accomplishing this object is to employ a fluid heat transfer system. However, galley heat requirements will vary considerably, both while the galley is in operation and between times when it is in operation and is shut down. It is desirable to maintain a substantially constant temperature and an adequate but not excessive supply of heat in the galley heat utilizing devices, regardless of the momentarily varying heat requirements, and also to provide means for dissipating the heat when the total heat requirement is low, to the end that the galley and adjacent space may not become overheated, to the possible discomfort of persons within or adjacent the galley. This, then, is a second object of my invention.

Such a fluid-filled system will normally incorporate elements which are potentially subject to damage by freezing of a contained liquid, either while in flight in cold air or during periods when the aircraft is idle, and it is a further object to provide such a system which is automatically protected against injury due to freezing, even though operating as a sealed system.

More specifically it is an object to provide a system of the general character indicated, in which the fluid heat transfer medium is heated by a boiler disposed within an exhaust stack of an engine, which boiler may alternatively be cooled or the temperature of which may be regulated, by cool air admitted from the exterior, coupled with means to control, preferably automatically, the relative amounts of hot gas and cool air supplied to the boiler in accordance with variations in the heat requirements of the galley, and moreover, to provide such a system which is subject to the least objections because of its aerodynamic characteristics, requirements for servicing, and the like.

A further object is to provide such a system which will be of minimum weight, consistent with the maximum heat requirements of the galley, which will be simple, and which will require the minimum of attention, either while operating or while idle; to provide such a system which is capable of supplying all the heat requirements of such a galley.

While the invention has been devised peculiarly in accordance with the requirements for heating a galley, the principles of the invention may be applied to various heating systems, more particularly to such a system wherein the heat requirements vary widely between a minimum or zero, to an appreciable maximum requirement, and especially for use upon aircraft.

A further object is to devise a servo control for use in such a system, but also of general application, to effect adjustment in accordance with a primary control, but without imposing an appreciable load upon the latter.

With these and other objects in mind, as will appear hereafter, my invention comprises the novel system as a whole, and the novel parts thereof, and their combination and arrangement with each other and within an aircraft, all as is shown in the accompanying drawings, described in this specification, and as will be more particularly defined by the claims which terminate the same.

In the accompanying drawings I have shown my invention embodied in forms such as are at present preferred by me, it being understood that various changes may be made in the form and characteristics of individual elements, and to some extent in their combination and relative arrangement, in accordance with the principles of my invention to be disclosed more fully hereafter.

Figure 4 is a diagrammatic illustration of the galley heat utilizing devices, such as would be connected to the system diagrammatically shown in Figure 1.

Figure 1:
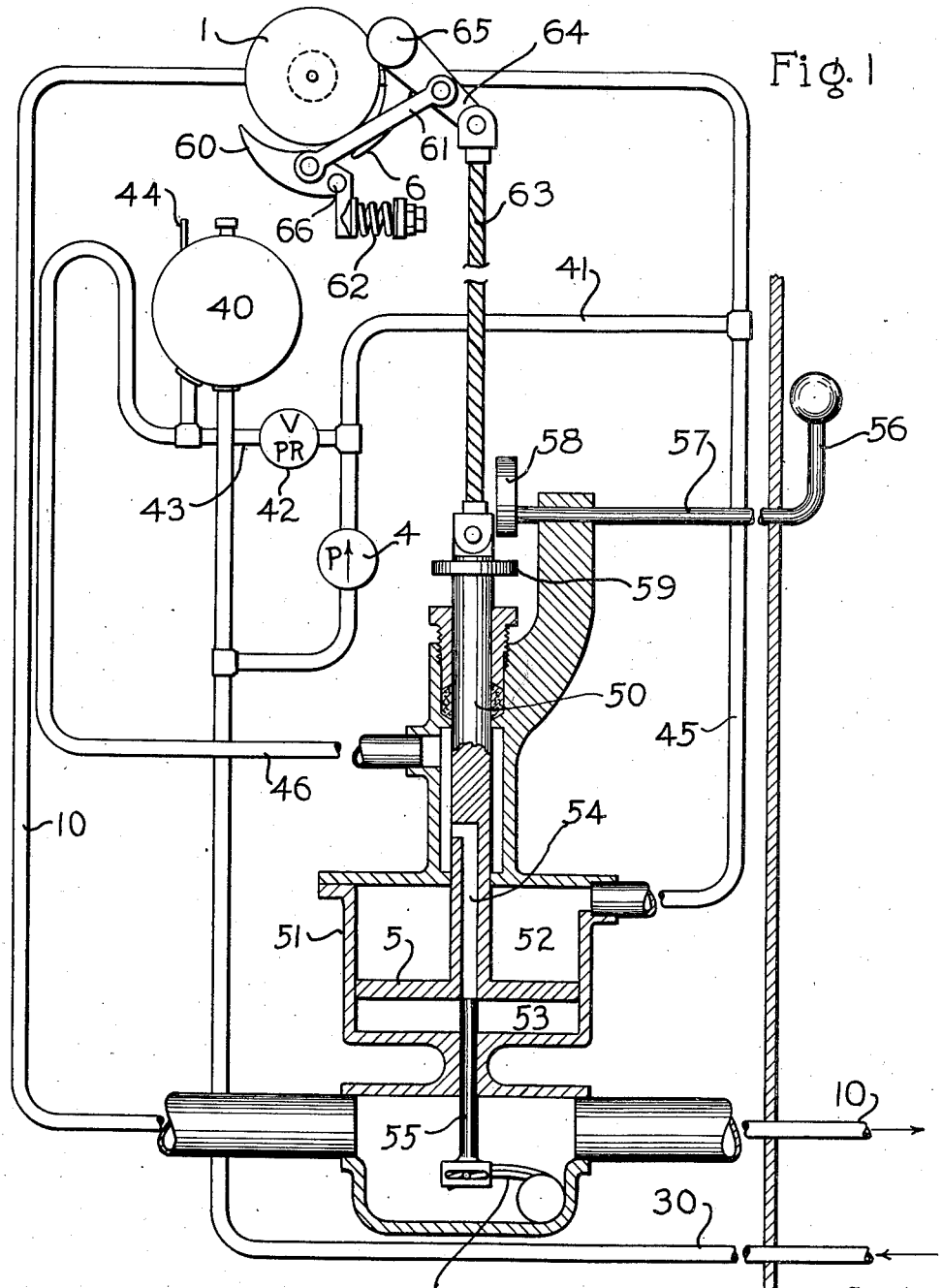
Figure 1 is a diagrammatic view of the system as a whole, omitting the heat utilizing devices, but including the automatic and manual controls for the same.

The system in its preferred form includes a boiler 1 (meaning thereby a device to heat a fluid, but not necessarily to the point of ebullition) disposed in the exhaust stack of an aircraft engine or otherwise capable of being supplied with hot gas from such an exhaust stack, to be heated thereby, and thereby to heat fluid within the boiler. This fluid may be water, but preferably is ethylene glycol, which is stable under such temperature conditions as would be permitted to obtain in the system, and which is not subject to freezing, except at extreme temperatures seldom, if ever, to be expected. This boiler is connected to heat utilizing devices 3, shown in Figure 4, within the galley, by a closed or sealed conduit system, whereby the heated fluid is transferred from the boiler to the heat utilizing devices, and preferably is returned from the latter to the boiler directly or indirectly. For instance, such a conduit system comprises the line 10 from the boiler past a temperature sensitive device or thermostat 2, and leading to a coil 3 within the galley, the latter constituting a heat utilizing device. From the latter the fluid may be returned by a conduit 30 to the intake side of a pump 4, or to a supply tank 40. The pump 4, drawing fluid either from the conduit 30 or from the tank 40, supplies this fluid under pressure through a conduit 41 to the boiler 1, and thence through the boiler back to the heat utilizing device, as previously described. A pressure relief valve 42 in a by-pass conduit 43 permits the fluid from the pressure side of the pump to be returned to the supply tank for recirculation, excluding the boiler and the heat utilizing device, in the event the pressure becomes excessive in the pressure side of the system. The tank is vented, as indicated by the vent 44, so that pressure of the fluid in the tank is substantially that of the surrounding atmosphere.

It may be pointed out here that a liquid-cooled engine, wherein the coolant is ethylene glycol (or water), may in itself constitute a boiler in the sense herein intended, and the heated coolant may itself be employed as the heat transfer medium.

The thermostat 2 constitutes part of a control device which is sensitive to variations in the temperature of the fluid, and which control device also includes a servo device operable under the influence of the difference in pressure between the pressure side of the pump and the pressure within the tank 40. This control device is automatically operable under the influence of these factors to control the extent of heating of the boiler, and of the fluid passing therethrough, which control may be accomplished in various ways, but which is preferably accomplished by controlling vanes 6 and 60 to vary the amount of hot gas permitted to impinge upon the boiler, and the amount of cool air permitted to impinge thereupon, these two vanes being connected for joint but opposite operation, as for instance by a link 61, as will be further described hereafter.

These vanes, or equivalent means to vary the heating effect upon the fluid medium, are preferably operable automatically under the influence of two opposed forces, which for any given temperature of the fluid move the vanes to a corresponding position, and are brought into equilibrium at such position, until a change in temperature effects a further movement of the vanes, and the opposed forces are brought to a new position of equilibrium. Thus one of these forces may be represented as the compression spring 62, tending to move the vanes into the extreme position permitting maximum heating of the boiler. The opposed force is represented by the servo device, operating under the pressure differential referred to.

Thus a piston 5 in a cylinder 51, having a stem 50 connected by a cable 63 to an arm 64 which operates the vanes, is subjected on one face to the pump pressure, by means of a connection 45 to the chamber 52. Since the piston is short, and is not tight in the cylinder, some leakage will occur past the piston into the chamber 53. The latter is connected, through a bore 54 in the stem 50 and through a connection 46, to the tank 40, having a vent 44. So long as the bore 54 is nearly closed, it will permit to pass only such leakage as occurs past the piston, and equilibrium will result, the piston remaining in position, with the effective pressure on its upper side balanced against the force of the spring 62. If the bore 54 is substantially fully closed, due to leakage the pressure on its opposite faces tends to equalize, the equilibrium is destroyed, and the spring 62 pulls the piston upward. If the bore 54, at equilibrium, is more widely opened, the fluid is vented therethrough from chamber 53 more rapidly than it is replaced by leakage. Again the equilibrium is destroyed, but in the opposite sense; the unbalanced pressure in chamber 52 forces the piston downward, overriding the spring 62.

To control this movement it is only necessary to provide means to more greatly close or open the bore 54. A pin 55, movable in the arrangement shown under the influence of the thermostat 2, and aligned with the outlet of the bore 54, constitutes such a means. At equilibrium it does not quite close the bore 54. As the temperature of the fluid drops, due to greater heat requirements of the galley, and in turn requiring greater heating of the boiler, the pin 55 rises, more greatly closing the bore 54; the spring 62 thereupon effects upward movement of the piston, and moves the vanes to a position where more hot gas and less cool air impinges upon the boiler. As the temperature of the fluid rises, the pin 55 moves downward, more greatly opening the bore 54, with the result that less hot gas and more cool air is permitted to impinge upon the boiler.

The pin 55 may, of course, be manually controlled, but it is admirably adapted to automatic control. While it is not actually the force of the thermostat which effects movement of the piston, the operation is easily understood by assuming that the piston is connected to and movable directly with the thermostat and its pin 55. The control is by no means operable only under the influence of a thermostat; in the general case, and broadly, the effective area of the bore is controlled by a member movable under the influence of any desired force, as pressure, velocity, etc., generally corresponding to a change in some physical characteristic of the controlling fluid.

At any time when it is desired to shut down the galley there is provided a manual control, consisting of the control handle 56 upon a rock shaft 57, controlling the position of a cam 58, which, riding upon a flange 59 upon the stem 50, will move the latter downwardly in opposition to the thermostat 2 and the spring 62, and moving the vanes to a position where a maximum of cold air and a minimum of hot gas is permitted to impinge upon the boiler 1.

The boiler may be of any suitable type. Preferably it is of the type which has been described in detail in my copending application Serial No. 160,372, filed August 23, 1937, and which forms the subject-matter of a further copending application, Serial No. 175,682, filed November 20, 1937. It is preferably provided with fins 11, placed parallel to the direction of movement of the gas and air to facilitate heat transfer. Fluid circulated through this boiler is heated or cooled as the boiler is exposed more to hot exhaust gas or to cool air. Such a boiler is preferably placed in the muff or terminus 7 of an exhaust stack 70 of an aircraft engine, this terminus 7 projecting beyond the skin 71 of the aircraft structure, and being so shaped, as indicated by the inclined end 72, that the relative air stream flowing over it, indicated by the arrows C, will produce a suction outwardly through this end 72. Preferably the boiler is located transversely of the direction of air flow, and in the forward portion of this terminus, and the latter is provided with a forwardly directed opening 73 for admission of cool air from the air stream, as indicated by arrows B, to impinge directly upon the boiler.

Within the stack 70 is mounted the vane 6, swingable about an axis 65 parallel to the boiler, and the vane 60 is similarly mounted to swing about an axis 66. The vane 60 controls the opening or closing of the opening 73, and the vane 6 is swingable to different positions to intercept more or less of the hot gas issuing from the stack, or to a position to substantially shield the boiler from these hot gases.

During periods of maximum heat requirements, when the boiler must be most highly heated, the temperature of the fluid tends to drop, and the thermostat 2 and piston 5 tend to move towards their uppermost position, thereby swinging the vane 6 widely open and swinging the vane 60 to a closed position, or as far towards such positions as is necessary to induce adequate heating of the fluid, and to restore equilibrium. Parts are shown in such an extreme position in dash lines in Figure 2. Part of the hot exhaust gas, under such conditions, is deflected by the vane 6 from within the exhaust stack, to impinge upon the boiler, the latter being shielded from cool air by the closed vane 60. The vane 6 may be provided with a protective salt, in the manner of engine valves, to prevent its burning out.

Figure 2:
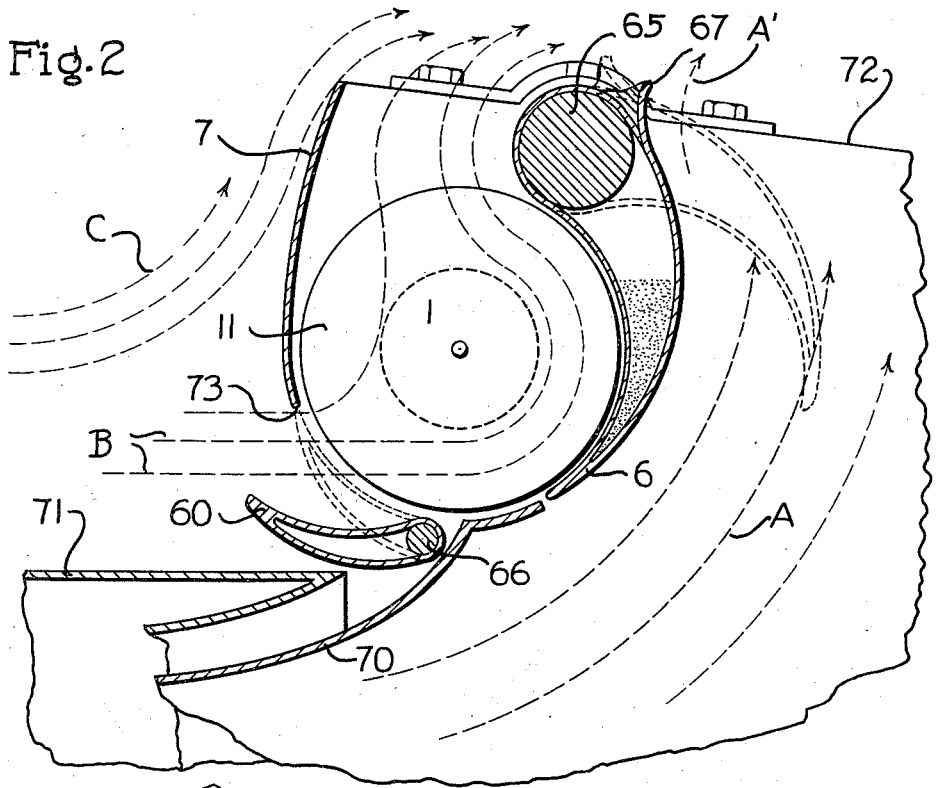
Figure 2 is a section through the exhaust stack, taken on a vertical longitudinal plane, illustrating the boiler mounting.
Figure 3:
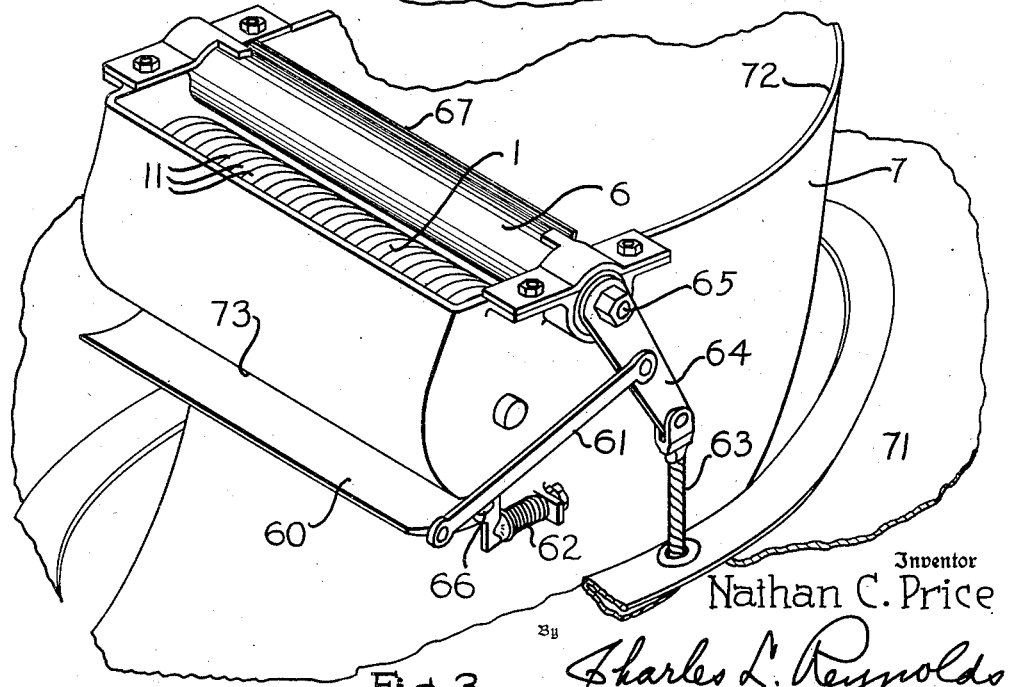
Figure 3 is a perspective view of the same.

However, when the heat requirements of the galley are at a minimum, and the temperature of the fluid is a maximum, the thermostat 2 is in its lowermost position, and the vanes 6 and 60 are in their full line position, as shown in Figure 2, with the result that impingement of cool air upon the boiler is a maximum, and a minimum amount of hot exhaust gas, or none, is intercepted by the vane 6. The vane 6 may be provided at its upper end with a lip 67 to direct the exhaust gas A outwardly and rearwardly, under such conditions, as indicated by the arrow A', and to prevent any tendency thereof to eddy forward over the upper edge of the vane 6. The general air stream C, as before, serves to produce suction of the air B past and through the boiler, and of the exhaust gas A as well out at the end 72 of the muff.

The heat utilizing devices in the galley may be of various kinds. The device shown at 3 in Figure 4 is in the form of a coil immersed in a water or steam bath, indicated at 31, the pressure of which may be maintained sufficiently high to afford cooking temperatures. Utensils 32 are employed for warming previously cooked food, or for cooking the food, and may assume any suitable form for the purpose. Again, branch lines 19 and 39 extend from the conduits 10 and 30, respectively, to a chamber 38 within which is immersed, in part at least, the expansion bulb 37 of a refrigerator, operating upon the absorption principle. The amount of fluid delivered thus may be controlled by a valve 18 in the line 19, and thus the heat supplied from the exhaust gas may be utilized to cook food, to warm up food, or to refrigerate food. Indeed, such heat may be employed in a variety of ways and for a variety of purposes, and such purposes are contemplated within the general term "heat utilizing device" as used in the present specification and claims.

The boiler, supply tank, pump, and control may all be located in the engine nacelle, and only the relatively small conduits 10 and 30 need extend through fire walls, partitions, and the like. Because they are small, the heat loss in the conduits is small, and because of this, and because their maximum temperature is far below the temperature of the hot exhaust gas, they will not appreciably increase the temperature of space through which they pass; they may be insulated if deemed necessary. The entire system may be and preferably is sealed against leakage. Parts may be arranged to drain into a sump, as disclosed in my application Serial No. 160,372, referred to above, or if the system is filled with ethylene glycol it is substantially proof against freezing. The conduits being small, they and their contents are low in weight, as is the entire system. Such a system, it is contemplated, will supply a maximum of 40,000 B. t. u.'s an hour, with a boiler weighing not over five pounds. The only exposed part of the system is the boiler and its surrounding muff, which create but little additional drag. The power required to operate the pump is small, and the heat extracted from the gas is waste heat. The design is such that the back pressure created is very low, since the boiler is largely out of the direct line of flow of the gas, and the outside air stream is used to assist in drawing the exhaust gas through the boiler.

What I claim as my invention is:

1. In a galley heating system for aircraft, in combination with a galley heat utilizing device of varying heat requirements, a fluid filled conduit system including said device, means included in the system subject to impingement of hot gas, thereby to heat the fluid, and subject also to impingement of cold air means movable in opposite directions to increase or to decrease the proportionate impingement of hot gas or cold air, thereby to vary the rate of heating of the fluid, opposed yieldable means operatively connected to the rate-controlling means to move the latter, and means movable in response to variations in the temperature of the fluid within the conduit, as governed by the requirements of the heat utilizing device, to govern movement of the opposed means between different positions of equilibrium, thereby to control the rate of heating automatically in accordance with the varying heat requirements of the heat utilizing device.

2. In a galley heating system for aircraft, in combination with a galley heat utilizing device of varying heat requirements, a fluid filled conduit system including said device, means included in the system and heated by heat emanating from the aircraft engine, thereby to heat the fluid, means movable in opposite directions to increase or to decrease the rate of heating of the fluid, yieldable means urging said rate-controlling means in one direction, servo means urging said rate-controlling means in the opposite direction, and including a piston subject to pressure at one side and vented at the opposite side, and means movable in response to variations in the temperature of the fluid within the conduit, as governed by the requirements of the heat utilizing device, tending to close the vent to the piston as the piston approaches each position assumed by the temperature-responsive means, thereby to effect and control the rate of heating in accordance with the heat requirements of the heat utilizing device.

3. In combination with the exhaust stack of an aircraft engine, and with a galley heat-consuming device, a boiler disposed within the exhaust stack, to be impinged by the hot exhaust gas, a closed conduit connecting the boiler and heat consuming device for circulation of fluid from one to the other, a vented fluid supply tank included in said conduit, a pump likewise included in said conduit, two means jointly movable to different positions to direct cool air and to direct exhaust gas, in varying amounts, to impinge upon the boiler, yieldable means to move said means in one direction, servo means responsive to the pressure differential between the vented tank and the pressure side of the pump, tending to move said first means in the other direction, and means responsive to changes in the temperature of the circulating fluid, tending to maintain equilibrium between the opposed means in any position thereof corresponding to a given temperature, thereby to govern the position of said first means, and thereby the temperature of the circulating fluid.

4. In combination with the exhaust stack of an aircraft engine, and with a heat consuming device, a boiler disposed in the exhaust stack, to be impinged by the hot exhaust gas, a conduit connecting the boiler and heat consuming device for circulation of fluid from one to the other, means movable to different positions to vary the amount of hot exhaust gas impinging upon the boiler, further means movable to different positions to vary the amount of cool air impinging upon the boiler, and means automatically responsive to the temperature of the fluid passing through such conduit to govern the relative positions of said first two means, thereby to maintain a predetermined temperature in the heat consuming device, regardless of fluctuations in its requirements.

5. In combination with the exhaust stack of an aircraft engine, and with a galley heat consuming device, a boiler disposed in the exhaust stack, to be impinged by the hot exhaust gas, a closed conduit connecting the boiler and heat consuming device for circulation of fluid from one to the other, a vented fluid supply tank included in said conduit, a pump likewise included in said conduit, means movable to different positions to vary the amount of exhaust gas impinging upon the boiler, and means responsive to the pressure differential between said vented tank and the pressure side of said pump to govern the position of said first means.

6. A galley heating system for aircraft comprising, in combination with the exhaust stack of an engine, and with a heat utilizing device in the galley, distant from such stack, a fluid transfer system including a boiler disposed in the stack in position to be impinged and heated by the hot exhaust gas, a fluid supply tank, conduits connecting the tank, the boiler, and the heat utilizing device for circulation of fluid, a pump included in the system to effect such circulation, and a control device including a piston within a cylinder, and subjected, on one side, to the output pressure of the pump, and on its other side to the vented pressure upon the tank, and a temperature-sensitive device disposed in the conduit between the boiler and the heat utilizing device, and arranged to close off communication between the tank and the piston, and means operable under the influence of said control device to vary the amount of exposure of the boiler to the hot exhaust gas.

7. A galley heating system for aircraft comprising, in combination with the exhaust stack of an engine, and with a heat utilizing device in the galley, of varying heat requirements, a boiler disposed in the stack in position to be impinged and heated by the hot exhaust gas, a conduit system connecting said boiler with the heat utilizing device, for circulation of fluid between the two, a control device incorporated in the conduit system, and sensitive to variations in the heat requirements of the heat utilizing device, and means automatically operable under the influence of said control device to cool said boiler positively when the rate of heat utilization is low.

8. A galley heating system for aircraft, in combination with the exhaust stack of an engine, and with a heat utilizing device in the galley, of varying heat requirements, a boiler, means to supply hot exhaust gas from the stack to the boiler, to heat it, means to supply cool air to the boiler, to cool it, a conduit system connecting the boiler with the heat utilizing device, for transfer of heated fluid from the former to the latter, a control device incorporated in the system, and sensitive to variations in the fluid's temperature, and means automatically operable under the influence of said control device to supply more or less cool air and less or more hot gas to the boiler, in accordance with change in temperature of the fluid.

9. A galley heating system for aircraft, in combination with the exhaust stack of an engine, and with a heat utilizing device in the galley, of varying heat requirements, a boiler, means to supply hot exhaust gas from the stack to the boiler, to heat it, means to supply cool air to the boiler, to cool it, a conduit system connecting the boiler with the heat utilizing device, for transfer of heated fluid from the former to the latter, a control device incorporated in the system, and sensitive to variations in the fluid's temperature, means automatically operable under the influence of said control device to supply more or less cool air and less or more hot gas to the boiler, in accordance with change in temperature of the fluid, and manual means to substantially cut off supply of hot gas to the boiler when the heat utilizing device is to be shut down.

10. A galley heating system for aircraft comprising, in combination with the exhaust stack of an engine, and with a heat utilizing device in the galley, of varying heat requirements, a boiler disposed in the stack in position to be impinged and heated by the hot exhaust gas, a conduit system connecting said boiler with the heat utilizing device, a continuously operable pump for circulation of fluid between the two, a control device incorporated in the conduit system, and sensitive to variations in heat requirements of the heat utilizing device, and to variations in temperature of the boiler, and means automatically operable under the influence of said control device to shield the boiler more or less from the hot exhaust gas, and less or more from cooling air, in accordance with the aforesaid factors affecting such control device, whereby regulation is effected by operation of said shielding means, without shut-down of the pump.

11. A galley heating system for aircraft comprising, in combination with the exhaust stack of an engine, and with a heat utilizing device in the galley, of varying heat requirements, a boiler disposed in the stack in position to be impinged and heated by the hot exhaust gas, a conduit system connecting said boiler with the heat utilizing device, for circulation of fluid between the two, a control device incorporated in the conduit system, and sensitive to variations in heat requirements of the heat utilizing device, and to variations in temperature of the boiler, and a vane automatically operable under the influence of said control device to intercept more or less of cool air, and to direct such intercepted air to the boiler to cool the latter, in accordance with the aforesaid factors affecting such control device.

12. A galley heating system for aircraft comprising, in combination with the exhaust stack of an engine, and with a heat utilizing device in the galley, of varying heat requirements, a boiler disposed in the stack in position to be impinged and heated by the hot exhaust gas, a conduit system connecting said boiler with the heat utilizing device, for circulation of fluid between the two, a control device incorporated in the conduit system, and sensitive to variations in heat requirements of the heat utilizing device, and to variations in temperature of the boiler, and two vanes connected for conjoint but differential operation, one movable to intercept more or less of the hot gas and to direct it to the boiler, and the other movable to intercept less or more cool air, and to direct it to the boiler, and means connecting said vanes for operation by said control device, and in accordance with the aforesaid factors affecting said control device.

13. A galley heating system for aircraft comprising, in combination with the terminus of an exhaust stack of an engine, disposed in the airstream and formed to produce a suction, and having a forwardly directed opening, and with a heat utilizing device in the galley, of varying heat requirements, a boiler disposed in such stack terminus in position to be impinged and heated by the hot exhaust gas, and to be impinged and cooled by exterior air entering through said opening, a conduit system connecting said boiler with the heat utilizing device for transfer of heated fluid from the former to the latter, a vane disposed in said opening and movable to open or close the same for controlled ingress of cool air, a second vane disposed in the stack terminus and movable to direct greater or lesser quantities of exhaust gas upon the boiler, and means to move said vanes jointly and differentially to regulate the heat supplied to the boiler, and thence to the heat utilizing device.

14. A galley heating system for aircraft comprising, in combination with the terminus of an exhaust stack of an engine, disposed in the airstream and formed to produce a suction, and having a forwardly directed opening, and with a heat utilizing device in the galley, of varying heat requirements, a boiler disposed in such stack terminus in position to be impinged and heated by the hot exhaust gas, and to be impinged and cooled by exterior air entering through said opening, a conduit system connecting said boiler with the heat utilizing device for transfer of heated fluid from the former to the latter, a vane disposed in said opening and movable to open or close the same, a second vane disposed in the stack terminus and movable to direct greater or lesser quantities of exhaust gas upon the boiler, and means responsive to variations in the heat requirements of the heat utilizing device to move said vanes jointly and differentially, to maintain a substantially constant temperature in the system.

15. In combination with the terminus of the exhaust stack of an aircraft engine, projecting into the airstream, and formed to produce a suction within the stack, a boiler disposed within the terminus, at its forward side, the stack having an opening directed forwardly for entrance of exterior air, to impinge and cool the boiler, a vane swingably mounted to close or to open said opening more or less, a second vane swingably mounted within the terminus to shield the boiler from the hot gas or to deflect more or less of the hot gas upon the boiler, to heat it, means joining the vanes for joint but opposite movement, whereby as the first vane moves to open the opening the second vane moves to shield the boiler, and means so to swing the vanes, to vary the degree of heating of the boiler.

16. A galley heating system for aircraft comprising, in combination with the exhaust stack of an engine, and with a heat-utilizing device in the galley, a fluid-filled system including a boiler disposed to be heated by the hot exhaust gas, conduit means for transfer of heated fluid from the boiler to the heat-utilizing device, deflector means movable between a cooling position, wherein cool surrounding air is directed by such deflector means over the boiler, and a heating position, wherein access of cool air is cut off, and the boiler is subjected to the hot exhaust gas, and means operable in accordance with change of temperature of the heat-utilizing device to adjust the position of said deflector means accordingly, and through various positions of equilibrium, to maintain a predetermined temperature.

17. A galley heating system for aircraft comprising, in combination with the exhaust stack of an engine, and with a heat-utilizing device in the galley, a fluid-filled system including a boiler disposed to be heated by the hot exhaust gas, conduit means for transfer of heated fluid from the boiler to the heat-utilizing device, deflector means movable between a cooling position, wherein cool surrounding air is directed by such deflector means over the boiler, and a heating position, wherein access of cool air is cut off, and the boiler is subjected to the hot exhaust gas, means yieldably urging the deflector means towards its heating position, and means movable in accordance with change of temperature of the heat-utilizing device to move the deflector means in opposition to the yieldable means to various positions of equilibrium, intermediate extreme cooling and heating positions, to maintain a predetermined temperature regardless of fluctuations of demand in the heat-utilizing device.

NATHAN C. PRICE.